United States Patent [19]

Stephenson

[11] 4,230,342
[45] Oct. 28, 1980

[54] PASSIVE SEAT BELT SYSTEM

[75] Inventor: Robert L. Stephenson, Sterling Heights, Mich.

[73] Assignee: Allied Chemical Corporation, Morris Township, Morris County, N.J.

[21] Appl. No.: 924,026

[22] Filed: Jul. 12, 1978

[51] Int. Cl.³ .............................................. B60R 21/10
[52] U.S. Cl. .................................... 280/803; 280/804
[58] Field of Search ............... 280/744, 745, 802, 803, 280/804; 297/388, 389

[56] References Cited

U.S. PATENT DOCUMENTS

| | | | |
|---|---|---|---|
| 3,679,229 | 7/1972 | Weststrate | 280/803 |
| 3,770,294 | 11/1973 | Hammer | 280/803 |
| 3,833,239 | 9/1974 | Coenen | 280/803 |
| 4,138,142 | 2/1979 | Wize | 280/803 |

FOREIGN PATENT DOCUMENTS

| | | | |
|---|---|---|---|
| 2304183 | 8/1973 | Fed. Rep. of Germany | 280/804 |
| 1407612 | 9/1975 | United Kingdom | 280/803 |

*Primary Examiner*—John J. Love
*Assistant Examiner*—Norman L. Stack
*Attorney, Agent, or Firm*—Roger H. Criss

[57] ABSTRACT

A vehicle passive seat belt restraint system comprising: a seat belt adapted for restraining an occupant positioned in a seat in the vehicle, the seat belt comprising a lap portion adapted to be secured around the lap of the occupant and a shoulder portion adapted to be secured around the upper torso of the occupant;
the lap and shoulder portions of the seat belt each having a first end connected to a door of the vehicle ajdacent to the seat and a second end connected to each other at a location spaced from the door;
a seat belt retractor connecting at least one of the first ends of the lap and shoulder portions to the door;
the seat belt further comprising a connecting portion having a first end connected to the vehicle at the side of the seat opposite the door and a second end connected to the second ends of the lap and shoulder portions;
a movable ring slidably engaging the lap portion at a location intermediate its first and second ends and permitting the seat belt to move therethrough;
a track mounted on the door, the movable ring being movable in the track; and
the movable ring being movable from a first position at which the seat belt is in position to restrain the occupant, to a second position at which the lap portion, the shoulder portion and the connecting portion of the seat belt are in non-restraining positions, thereby permitting easy ingress to and egress from the seat.

11 Claims, 1 Drawing Figure

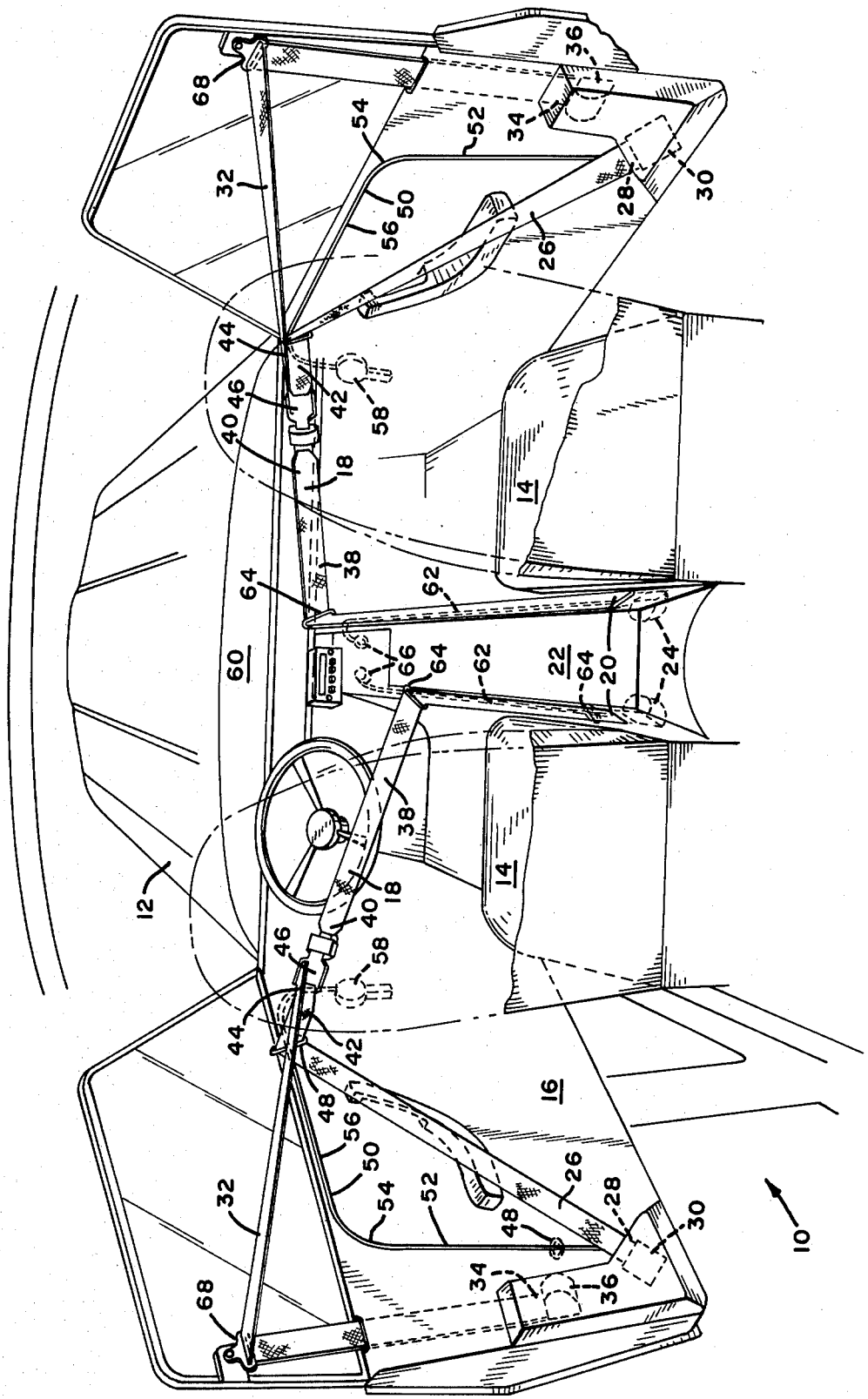

PASSIVE SEAT BELT SYSTEM

BACKGROUND OF THE INVENTION

1. Field of the Invention

This invention relates to improvements in passive seat belt systems for vehicle occupants.

2. Description of the Prior Art

Passive seat belt systems, especially for automobile occupants, in which a seat belt restraint automatically moves into position about the occupant, have previously been suggested. Typically, such a system is actuated upon closing of the vehicle door although other actuating conditions have been proposed. By "passive" seat belt system is meant that the seat belt is automatically positioned about the occupant prior to movement of the vehicle; these systems are in distinction to the typical "active" seat belt system which includes belt webbing connected to a tongue or like device which must be actively fastened by the occupant to a cooperating seat belt buckle or the like.

Passive seat belt systems have been proposed wherein a single belt is positioned around the torso of the occupant or alternatively wherein a combination of lap and shoulder belts are utilized.

One problem associated with previous systems is that the belts do not move sufficiently out of the way when the door is opened or other actuating condition occurs so as to permit convenient and comfortable ingress to and egress from the vehicle.

SUMMARY OF THE INVENTION

In accordance with this invention, there is provided a vehicle passive seat belt restraint system comprising:

a seat belt adapted for restraining an occupant positioned in a seat in the vehicle, the seat belt comprising a lap portion adapted to be secured around the lap of the occupant and a shoulder portion adapted to be secured around the upper torso of the occupant;

the lap and shoulder portions of the seat belt each having a first end connected to a door of the vehicle adjacent to the seat and a second end connected to each other at a location spaced from the door;

seat belt retractor means connecting at least one of the first ends of the lap and shoulder portions to the door;

the seat belt further comprising a connecting portion having a first end connected to the vehicle at the side of the seat opposite the door and a second end connected to the second ends of the lap and shoulder portions;

movable means slidably engaging the lap portion at a location intermediate its first and second ends, the movable means permitting the seat belt to move therethrough;

track means mounted on the door, the movable means being movable in the track means; and means for moving the movable means from a first position at which the seat belt is in position to restrain the occupant, to a second position at which the lap portion, the shoulder portion and the connecting portion of the seat belt are in non-restraining positions, thereby permitting easy ingress to and egress from the seat.

It has been found that the passive restraint system of this invention provides increased ease of entry to and exit from the vehicle since the seat belt is moved to an extreme forward position when the door is opened or other actuating condition occurs, with the lap and shoulder portions in close proximity to the door and the connecting portion located forward of the seat and adjacent to the side of the seat opposite the door. The passive seat belt restraint system of this invention may be used with either the driver's or front passenger's position.

BRIEF DESCRIPTION OF THE DRAWING

The sole FIGURE is a perspective view of the passive seat belt restraint system of this invention, as viewed from the rear of the vehicle.

DESCRIPTION OF THE PREFERRED EMBODIMENTS

With reference to the drawing, the passive seat belt system of this invention, generally indicated at 10 in vehicle 12 having a seat 14 adjacent to door 16, includes a seat belt 18 attached at a first end to door 16 and at its second end 20 to the vehicle at the side of seat 14 opposite door 16. Second end 20 may be affixed to the vehicle in console 22 located above the transmission shaft or directly to the vehicle floor. Preferably, second end 20 is connected to vehicle 12 through a conventional seat belt retractor 24 preferably located in console 22. In this description, reference is particularly made to the passive seat belt sysyem for the driver's seat but it is also applicable to the passenger's seat.

Seat belt 18 preferably includes a lap portion 26 having a first end 28 connected to door 16, preferably through a seat belt retractor 30, a shoulder portion 32 having a first end 34 connected to door 16, preferably through a seat belt retractor 36 and a connecting portion 38 having a first end (corresponding to second end 20 of seat belt 18) and a second end 40. Second end 40 of connecting portion 38 communicates with second ends 42 and 44 of lap portion 26 and shoulder portion 32, respectively, preferably through a releasable interconnection 46 in the form of a conventional buckle and tongue assembly. Releasable interconnection 46 provides a means of releasing seat belt 18 in case of an emergency. Retractors 24, 30 and 36 are preferably of the emergency locking type. Such retractors may be of the vehicle sensitive, web sensitive or both vehicle and web sensitive types. At least one of the connections to ends 20, 28 and 34 is in the form of a retractor and preferably each of said ends is connected to a retractor to facilitate movement of seat belt 18 with increased comfort to the occupant.

Movable means 48 slidably engages lap portion 26 at a location intermediate its ends. Such means are preferably in the form of a slip ring having a generally D shape. Ring 48 is mounted for movement in track 50 provided on door 16. Track 50 has a generally vertical portion 52 commencing adjacent to retractor 30 and terminating in a curved portion 54 which in turn is connected to a generally horizontal portion 56. Thus, a single continuous track is provided. Ring 48 is connected via a cable (not shown) within track 50 to a reversible winding motor 58 which may be located, for example, in door 16 or beneath the dashboard 60 of vehicle 12. Ring 48 is movable from a first position (restraining position) on track portion 52 adjacent retractor 30 to a second position (non-restraining position) on track portion 56 adjacent to the front of door 16. Ring 48 has a central opening which permits lap portion 26 to move therethrough.

Preferably, a second track 62 is provided on or adjacent to console 22 and extends from a first rearward position adjacent retractor 24 to a second position forward of the first position. Mounted in second track 62 is a second movable means 64 also preferably in the form of a D-shaped slip ring having a central opening through which connecting portion 38 of seat belt 18 extends. Ring 64 is preferably moved by a second reversible winding motor 66 via a cable (not shown) in track 62. Motor 66 may be located, for example, within console 22 or in dashboard 60.

To provide the desired angular relationship of shoulder portion 32, preferably the seat belt extends from retractor 36 mounted on door 16 through a run through bracket 68 fixed on door 16 at a location above the height of the occupant's shoulder when sitting in seat 14.

In operation, when door 16 is closed, slip ring 48 is located in its dotted line position in track portion 52 and slip ring 64 is located in its dotted line position in track 62 on console 22. Releasable interconnection 46 is located closely adjacent to ring 64 and lap portion 26 and shoulder portion 32 are in their restraining positions surrounding seat 14. Upon actuation of motors 58 and 66 which may result from the opening of door 16 as detected, for example, by a micro-switch in the jamb or front pivot area of door 16, or any other desired condition, ring 48 is pulled upwards, via its cable connection to motor 58, along track portion 52 and thence around track portion 54 to track portion 56. Motion of slip ring 48 causes seat belt webbing associated with retractor 30 to be extended therefrom. When the webbing has been fully extended from retractor 30, continued forward motion of ring 48 on track portion 56 causes extraction of webbing associated with retractor 24. At the same time as motor 58 moves ring 48 upwards and forwards, motor 66 (if present) moves ring 64 forwards along track 52. Also, since releasable interconnection 46 is being moved forward and towards door 16, excess webbing associated with shoulder portion 32 is rewound on retractor 36 by its associated rewind spring. The forward limit of rings 48 and 64, as well as seat belt 18 and its portions, are shown in solid lines in the FIGURE. It can be seen that both lap portion 26 and shoulder portion 42 are closely adjacent door 16 and releasable interconnection 46 as located adjacent door 16 in an elevated position. A part of connecting portion 38 extends parallel to track 62 with a remainder of portion 38 extending from a forward part of console 22 to releasable interconnection 46 in a position closely adjacent to the steering wheel of vehicle 12. It would be appreciated that in the non-restraining position, there is a maximum area of non-interference by seat belt 18 which permits ready and easy ingress to and egress from seat 14 by the occupant.

When door 16 is closed or the other actuating condition occurs, motors 58 and 66 cause reverse movement of rings 48 and 64, respectively, towards their restraining positions. Excess webbing associated with lap portion 26 and connection portion 38 are wound up on retractors 30 and 24, respectively. At the same time, webbing is extended from retractor 36 to provide additional length of webbing for shoulder portion 32. When rings 48 and 64 have moved to their rearward, restraining positions, seat belt 18 is in position around seat 14, with releasable interconnection 46 lying adjacent to the lower right hand side of the driver's seat 14 as viewed in the FIGURE.

It can be seen that a single continuous track is provided on door 16 which moves both the lap and shoulder portions of the seat belt. It is also to be noted that the connecting point of lap portion 26 and shoulder portion 32 is located at a position removed from door 16. In addition, the provision of at least one seat belt retractor on the door of the vehicle permits easy rewind of excess webbing as well as extension of desired webbing for placing around the occupant in position of the seat.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A vehicle passive seat belt restraint system comprising:
   a seat belt adapted for restraining an occupant positioned in a seat in said vehicle, said seat belt comprising a lap portion adapted to be secured around the lap of said occupant and a shoulder portion adapted to be secured around the upper torso of said occupant;
   a lap belt retractor mounted on a door of said vehicle adjacent to said seat, one end of said lap belt portion being wound on said lap belt retractor and the opposite end of said lap belt portion being connected to a connecting means positioned at a location spaced from said door;
   a shoulder belt retractor mounted on said door, one end of said shoulder belt portion being wound on said shoulder belt retractor and the opposite end of said shoulder belt portion being connected to said connecting means whereby said lap and shoulder belt portions are connected to each other at a location spaced from said door;
   said seat belt further comprising a connecting portion having a first end connected to said vehicle at the side of said seat opposite said door and a second end connected to said connecting means;
   movable means slidably engaging said lap portion at a location intermediate its ends, said movable means permitting said seat belt to move therethrough;
   track means mounted on said door, said movable means being movable in said track means;
   means for moving said movable means from a first position at which said seat belt is in position to restrain said occupant, to a second position at which said lap portion, said shoulder portion and said connecting portion of said seat belt are in non-restraining positions;
   a second track means located in said vehicle at the side of said seat opposite said door and a second movable means movable in said second track means, said second movable means slidably engaging said connecting portion of said seat belt, said second movable means being movable from a first position adjacent the rear of said seat to a second position adjacent the front of said seat, said second movable means being in its first and second positions when said first movable means is in its first and second positions, respectively;
   a seat belt retractor connecting said first end of said connecting portion of said seat belt to said vehicle at said opposite side of said seat; and
   second moving means for moving said second movable means, movement of said movable means along said track means mounted on said door resulting initially in unwinding of said lap belt portion from said lap belt retractor, followed by unwinding of said connecting portion from its associated retractor, thereby permitting easy ingress to and egress from said seat.

2. A vehicle passive seat belt restraint system comprising:
- a seat belt adapted for restraining an occupant positioned in a seat in said vehicle, said seat belt comprising a lap portion adapted to be secured around the lap of said occupant and a shoulder portion adapted to be secured around the upper torso of said occupant;
- a lap belt retractor mounted on a door of said vehicle adjacent to said seat, one end of said lap belt portion being wound on said lap belt retractor and the opposite end of said lap belt portion being connected to a connecting means positioned at a location spaced from said door;
- a shoulder belt retractor mounted on said door, one end of said shoulder belt portion being wound on said shoulder belt retractor and the opposite end of said shoulder belt portion being connected to said connecting means whereby said lap and shoulder belt portions are connected to each other at a location spaced from said door;
- said seat belt further comprising a connecting portion having a first end connected to said vehicle at the side of said seat opposite said door and a second end connected to said connecting means; 1
- movable means slidably engaging said lap portion at a location intermediate its ends, said movable means permitting said seat belt to move therethrough;
- track means mounted on said door, said movable means being movable in said track means; and
- means for moving said movable means from a first position at which said seat belt is in position to restrain said occupant, to a second position at which said lap portion, said shoulder portion and said connecting portion of said seat belt are in non-restraining positions, thereby permitting easy ingress to and egress from the seat.

3. The passive restraint system of claim 2 wherein said opposite ends of said lap and shoulder belt portions are fixed to said connecting means.

4. The passive restraint system of claim 2 wherein said connecting means comprises a releasable interconnection whereby said opposite end of said lap and shoulder belt portions may be separated from said second end of said connecting portion.

5. The passive restraint system of claim 2 wherein said track means comprises a single continuous track.

6. The passive retraint system of claim 2 wherein said movable means comprises a slip ring movable in said track.

7. The passive restraint system of claim 6 wherein said first position of said movable means is located on said door at a position rearward of and lower than said second position.

8. The passive restraint system of claim 2 including a second track means located in said vehicle at the side of said seat opposite said door and a second movable means movable in said second track means, said second movable means slidably engaging said connecting portion of said seat belt, said second movable means being movable from a first position adjacent the rear of said seat to a second position adjacent the front of said seat, said second movable means being in its first and second positions when said first movable means is in its first and second positions, respectively.

9. The passive restraint system of claim 8 including a second moving means for moving said second movable means.

10. The passive restraint system of claim 2 including a seat belt retractor mounted in said vehicle at a location adjacent the side of said seat opposite said door and connected to said first end of said connecting portion.

11. The passive restraint system of claim 2 wherein said movable means is in said first position when said door is closed and is moved to its second position by said moving means when said door is opened.

* * * * *